Patented July 22, 1941

2,250,006

UNITED STATES PATENT OFFICE 2,250,006

ANESTHETIC COMPOUNDS

Robert R. Burtner, Skokie, Ill., assignor to G. D. Searle & Co., Chicago, Ill., a corporation of Illinois No Drawing. Application February 17, 1941, Serial No. 379,280

6 Claims. (Cl. 260—315)

My invention relates to the production of dialkylaminoalkanol esters of carbazole 2, 3 or 4, and more specifically of carbazole-4-carboxylic acids which possess the general formula:

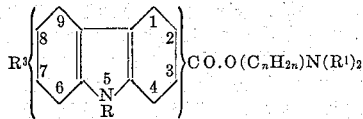

where

R is H, methyl, ethyl, propyl, butyl, amyl or benzyl $R^1$ is methyl, ethyl, propyl, butyl, amyl or benzyl $n$ is an integer from 1 to 4 (the chain being either straight or branched)

$R^3$ is H, $NH_2$, OH or $OR^2$ ($R^2$ being methyl, ethyl, propyl, butyl, amyl or benzyl) and may be attached to any carbon of the carbazole nucleus not already substituted by the carboxyl group.

This application constitutes a continuation in part of my co-pending application Serial No. 196,542 for Anesthetic compounds.

These esters may be used in the form of their free bases or of their salts with organic or inorganic acids or with complexes such as the borates.

General methods of synthesis of compound of this series

The acid chloride of a carbazole carboxylic acid or of a substituted carbazole carboxylic acid is treated with one equivalent of the desired dialkylaminoalkanol in an inert solvent such as benzene. The mixture is heated for a short time to insure completion of the reaction. The reaction mixture is shaken with dilute hydrochloric acid, causing the hydrochloride of the dialkylaminoalkanol carbazole carboxylate to dissolve in the aqueous phase. By making this aqueous solution alkaline with sodium hydroxide, the free base precipitates. It is separated, and dissolved in ether or acetone, which solution is then treated with an excess of dry hydrogen chloride. The resulting precipitate is then crystallized from a suitable solvent.

If an aminocarbazole carboxylic acid derivative is desired, the corresponding nitrocarbazole carboxylic acid chloride is used at the beginning and the aqueous solution obtained above by shaking with dilute hydrochloric acid is directly reduced with such reagents as, for example, tin and hydrochloric acid and is then worked up in the usual way.

Those compounds with OH or $R^2O$ as substituents are prepared by starting with the acid chloride of the appropriately substituted carbazole carboxylic acid, and by then proceeding in substantially the same manner.

These derivatives, either substituted or unsubstituted, constitute a new class of anesthetics. The effect of the substitutions is to increase or in some cases decrease the efficacy as compared to the unsubstituted compounds and may also affect the toxicity, either favorably or adversely. However, for illustration, the properties of the three simplest compounds may be compared with the well-known local anesthetic, cocaine. In these examples, the first figure gives the toxicity, using cocaine as a reference, and the second gives the duration of anesthesia of the rabbit's cornea, in minutes:

Cocaine—1.00–15 minutes using a 1% solution; hydrochloride of diethylaminoethanol carbazole-2-carboxylate—1.00–87 minutes using a 1% solution; hydrochloride of diethylaminoethanol carbazole-3-carboxylate—0.38–16 minutes using a 0.1% solution; hydrochloride of diethylaminoethanol carbazole-4-carboxylate—0.08–8 minutes using a 1% solution.

These esters are anesthetic either as the free bases or as the salts with organic or inorganic acids. Moreover, they form water-soluble, anesthetic complexes with metaboric acid, in the same fashion as do procaine and other compounds of the same type. Such salts and complexes modify the time required for onset of anesthesia, as well as the length of its duration. They are useful from a solubility standpoint as, by appropriate selection of acid group, the solubility in water or in non-aqueous solvents may be appreciably modified in desired directions. The salts are more stable than are the free bases as regards freedom from oxidation by air, etc. Any substantially non-toxic acid may be employed for preparing the salts. The base in appropriate organic solvent may be treated with a solution of the desired acid and the solvents then removed, or the base may be dissolved by shaking with an aqueous solution of the chemical equivalent of acid and the solvent then evaporated. In either case, the salt may be further purified by crystallization from appropriate solvent or by precipitation from solution by addition of an appropriate liquid in which the salt is fairly insoluble.

*Specific compounds in this series*

A specific compound belonging to the general series as above defined is the β-diethylaminoethyl ester of carbazole-2-carboxylic acid. It may be prepared by the general process described above. 12 g. of β-diethylaminoethanol in 25 cc. of benzene are added slowly to 23 g. of the acid chloride of carbazole-2-carboxylic acid (prepared by the interaction of the acid and phosphorus pentachloride) in 200 cc. of benzene. To insure completion of the reaction, the mixture is heated for three hours on a water bath after which it is shaken with dilute hydrochloric acid. The aqueous layer is separated and made alkaline with sodium hydroxide. The precipitated β-diethylaminoethyl ester of carbazole-2-carboxylic acid is extracted with ether, the ethereal extract dried and then saturated with dry gaseous hydrogen chloride. The resulting precipitate is crystallized thrice from methyl alcohol to obtain the hydrochloride, melting at 195° C. The product is a local anesthetic. By neutralizing the free base with other acids besides hydrochloric, various salts may be obtained.

β-diethylaminoethyl carbazole-3-carboxylate, prepared by the same method, melts at 127° C.

β-diethylaminoethyl carbazole-4-carboxylate, prepared by the same method, was an oil. Its salts however were solids.

Substitution of the acid chloride of 5-ethyl carbazole-2-carboxylic acid in the example given above, yields by only slight modification of procedure, the β-diethylaminoethyl ester in good yield.

8-nitro carbazole-2-carboxylic acid β-diethylaminoethyl ester, prepared by essentially the same procedure, is dissolved in ethyl alcohol, concentrated hydrochloric acid is added and the mixture is shaken with an excess of granular tin until reduction of the nitro group to form the amino group is complete. The excess tin is filtered off, and the alcohol is distilled off. The remaining tin is removed as the sulfide with hydrogen sulfide. The mixture is made faintly alkaline with sodium hydroxide and the precipitate is extracted with ether. The ether solution is dried and filtered with charcoal. Upon evaporating off the solvent the ester of 8-amino carbazole-2-carboxylic acid is secured as a crystalline residue. It may be re-crystallized from suitable solvents.

14 gm. of β-dibutylaminoethanol dissolved in benzene, are slowly added to a solution of 23 gm. of the acid chloride of carbazole-2-carboxylic acid, similarly dissolved. After standing briefly, the mixture is heated to insure completion of the reaction, cooled, and extracted with an excess of dilute hydrochloric acid. The aqueous layer is separated, filtered with charcoal, and made alkaline with sodium hydroxide. The liberated ester is extracted with ether, the ethereal solution is dried and filtered with charcoal. The ester may be converted to its hydrochloride with gaseous hydrogen chloride. By addition of ethereal solutions of appropriate organic acids in equivalent quantity, the material is converted to its organic salts. These are recovered by evaporating the ether and may be re-crystallized from appropriate solvents.

7-ethoxycarbazole-3-carboxylic acid (prepared by acetylation of 7-ethoxycarbazole and oxidation of the acetyl group) is converted to the acid chloride with phosphorus pentachloride. 14 g. of β-diethylaminoethanol in benzene are added slowly to a solution of 27.3 g. of the above acid chloride similarly dissolved. The mixture is heated to insure completion of the reaction, cooled, and extracted with an excess of dilute hydrochloric acid. The aqueous layer is separated, filtered with charcoal and made alkaline with sodium hydroxide. The precipitated ester is taken up in ether, the ethereal solution dried and then saturated with hydrogen chloride. The crude β-diethylaminoethyl 7-ethoxycarbazole-3-carboxylate hydrochloride thus obtained is crystallized from suitable solvents. Alternatively, there may be added to the ethereal solution of the base, its equivalent of sulfuric acid. After evaporation of the ether the sulfate of the ester is secured. This may be re-crystallized for further purification.

24.1 gm. (0.1 mole) of 8-methoxycarbazole-4-carboxylic acid is dissolved in 150 cc. of warm isopropanol. To this solution 13.5 gm. (0.1 mole) of β-diethylaminoethyl chloride is added and the mixture is refluxed for three hours. Most of the solvent is distilled off and the mixture poured into dilute aqueous alkali. Ether extraction of this alkali solution yields the oily free base which may be converted into the hydrochloride by addition of the calculated amount of absolute alcoholic hydrogen chloride to the dried ethereal solution of the ester. This hydrochloride may be recrystallized from a mixture of isopropanol and ether.

Use of other alkylaminoalkyl chlorides, such as for instance, β-diethylaminopropyl chloride, β-dibutylaminoethyl chloride, etc., will by the same procedure, yield the corresponding dialkylaminoalkyl ester of the 8-methoxycarbazole-4-carboxylic acid.

25.6 gm. (0.1 mole) of 8-nitrocarbazole-4-carboxylic acid is converted to the acid chloride by means of phosphorous trichloride in the usual manner. This acid chloride is dissolved in 150 cc. of dry benzene and 11.7 gm. (0.1 mole) of β-diethylaminoethanol is added. The mixture is refluxed for two hours, cooled and poured into dilute aqueous alkali. Ether extraction of this solution and subsequent removal of the ether yields the free basic ester which is then dissolved in a mixture of alcohol and concentrated hydrochloric acid and shaken with an excess of granular tin until reduction is complete. Unused tin is filtered off and the alcohol removed by distillation. The residue is diluted with water and tin salts precipitated as sulfide by the use of hydrogen sulfide. The filtered solution is made faintly alkaline and the amino ester recovered by extraction with ether. It may be converted to its hydrochloride by the addition of an equivalent amount of alcoholic hydrogen chloride solution to the dried ether solution of the basic ester.

Substitution of other dialkylamino alcohols for the one specified in the above example will give the corresponding other dialkylaminoalkyl esters of the 8-aminocarbazole-4-carboxylic acid.

In both of the above examples, other salts of the basic esters may be prepared by using an alcoholic solution of other acids in place of the alcoholic hydrogen chloride as specified.

The foregoing specific examples have been given merely for the purpose of illustrating the invention and the means of practicing it, and it will be understood that substitution may be made and equivalent modifications employed by those skilled in the art without departing from the spirit and scope of my invention. No unnecessary limitations should, therefore, be understood therefrom, but the appended claims should be construed as broadly as permissible in view of the prior art.

I claim:

1. Anesthetic preparations comprising dialkylaminoalkanol esters of carbazole-4-carboxylic acids and salts thereof of the formula

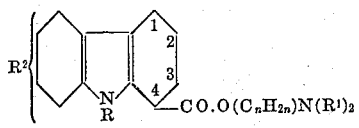

where

R is of the group consisting of H, methyl, ethyl, propyl, butyl, amyl and benzyl, $R^1$ is of the group consisting of methyl, ethyl, propyl, butyl, amyl and benzyl, $R^2$ is of the group consisting of H, $NH_2$, and $OR^3$ and may be attached to any carbon of the carbazole nucleus other than that substituted by the carboxyl group, $R^3$ is of the group consisting of H, methyl, ethyl, propyl, butyl, amyl and benzyl, $n$ is an integer from 1 to 4 (chain may be straight or branched).

2. Anesthetic preparations comprising dialkylaminoalkanol esters of carbazole-4-carboxylic acids of the formula

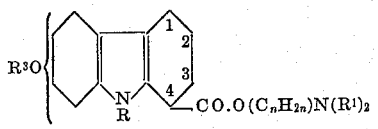

where R, $R^1$, $R^3$ and $n$ have the same significance as in claim 1, and where the $OR^3$ group may be attached to any carbon of the carbazole nucleus other than 4.

3. Anesthetic preparations comprising dialkylaminoalkanol esters of carbazole-4-carboxylic acids of the formula

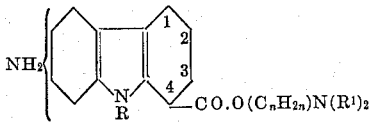

where R, $R^1$ and $n$ have the same significance as in claim 1, and where the $NH_2$ group may be attached to any carbon of the carbazole nucleus other than 4.

4. Anesthetic preparations comprising dialkylaminoalkanol esters of carbazole-4-carboxylic acids and salts thereof of the formula

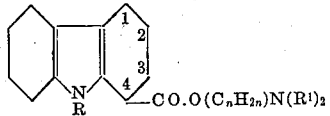

where R, $R^1$ and $n$ have the same significance as in claim 1.

5. An anesthetic preparation comprising the β-diethylaminoethyl ester of carbazole-4-carboxylic acid, of the formula

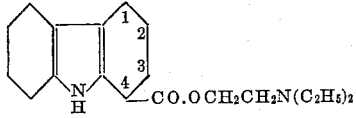

6. Anesthetic preparations comprising dialkylaminoalkanol esters of carbazole-4-carboxylic acids of the formula

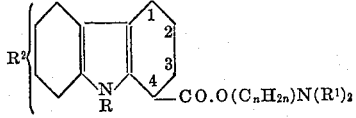

where R, $R^1$, $R^2$, $R^3$, and $n$ have the same significance as in claim 1 and where $R^2$ may be attached to any carbon of the carbazole nucleus other than 4.

ROBERT R. BURTNER.